United States Patent
Thaper

(10) Patent No.: US 8,572,599 B2
(45) Date of Patent: Oct. 29, 2013

(54) PROVISIONING DEVICE MAKE AND MODEL INFORMATION FOR FIRMWARE OVER-THE-AIR (FOTA)

(75) Inventor: Atul Thaper, Flemington, NJ (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 1127 days.

(21) Appl. No.: 12/144,269

(22) Filed: Jun. 23, 2008

(65) Prior Publication Data
US 2009/0319848 A1 Dec. 24, 2009

(51) Int. Cl.
*G06F 9/44* (2006.01)

(52) U.S. Cl.
USPC ............ 717/168; 717/171; 717/173; 717/120

(58) Field of Classification Search
None
See application file for complete search history.

(56) References Cited

U.S. PATENT DOCUMENTS

| | | | |
|---|---|---|---|
| 7,316,013 B2* | 1/2008 | Kawano et al. | 717/168 |
| 7,987,449 B1* | 7/2011 | Marolia et al. | 717/120 |
| 8,051,414 B2* | 11/2011 | Stender et al. | 717/168 |
| 8,205,189 B2* | 6/2012 | Grossman et al. | 717/120 |
| 8,407,669 B2* | 3/2013 | Yee et al. | 717/120 |
| 8,418,168 B2* | 4/2013 | Tyhurst et al. | 717/173 |
| 2002/0129356 A1* | 9/2002 | Hellerstein et al. | 717/177 |
| 2004/0044623 A1* | 3/2004 | Wake et al. | 705/40 |
| 2004/0068721 A1* | 4/2004 | O'Neill et al. | 717/168 |
| 2004/0093597 A1* | 5/2004 | Rao et al. | 717/171 |
| 2004/0243993 A1* | 12/2004 | Okonnen et al. | 717/168 |
| 2005/0039178 A1* | 2/2005 | Marolia et al. | 717/168 |
| 2006/0035631 A1* | 2/2006 | White et al. | 455/418 |
| 2006/0106806 A1* | 5/2006 | Sperling et al. | 707/10 |
| 2006/0130046 A1* | 6/2006 | O'Neill | 717/168 |
| 2006/0143098 A1* | 6/2006 | Lazaridis | 705/34 |
| 2006/0184927 A1* | 8/2006 | Deblaquiere et al. | 717/168 |
| 2006/0217111 A1* | 9/2006 | Marolia et al. | 455/418 |
| 2007/0150815 A1* | 6/2007 | Smith et al. | 715/733 |
| 2007/0169073 A1* | 7/2007 | O'Neill et al. | 717/168 |
| 2008/0005733 A1* | 1/2008 | Ramachandran et al. | 717/168 |
| 2008/0109801 A1* | 5/2008 | Levine et al. | 717/171 |
| 2008/0184277 A1* | 7/2008 | Burns et al. | 719/327 |
| 2009/0007091 A1* | 1/2009 | Appiah et al. | 717/171 |
| 2009/0023435 A1* | 1/2009 | Kuivalainen | 455/419 |
| 2009/0094593 A1* | 4/2009 | Jaung | 717/173 |
| 2009/0119681 A1* | 5/2009 | Bhogal et al. | 719/318 |
| 2009/0125900 A1* | 5/2009 | Matlin et al. | 717/173 |

OTHER PUBLICATIONS

Dan Ostergerg, Rethinking Software Updating; Concepts for Improved Updatability, TUCS Turku Centre for Computer Science, 2003, pp. 1-4 and 7-13.*

Moshe Rozenblit, O, A&M Capabilities for switching software management, Network Operations Protocol and Standards, Bellcore, Red Bank, NJ, 1993, pp. 357-361.*

William Vambenepe, Dealing with Seale and Adaptation of Global Web Services Management, 2005, pp. 1-7.*

* cited by examiner

*Primary Examiner* — Thuy Dao
*Assistant Examiner* — Mongbao Nguyen

(57) ABSTRACT

A device receives identifier, make, and model information associated with a device from a device activation system, and provides the device identifier, make, and model information to a database. The device also determines whether the device qualifies for a software update package based on the device make and model information, and provides, to the device, a notification of the software update package when the device qualifies for the software update package.

25 Claims, 12 Drawing Sheets

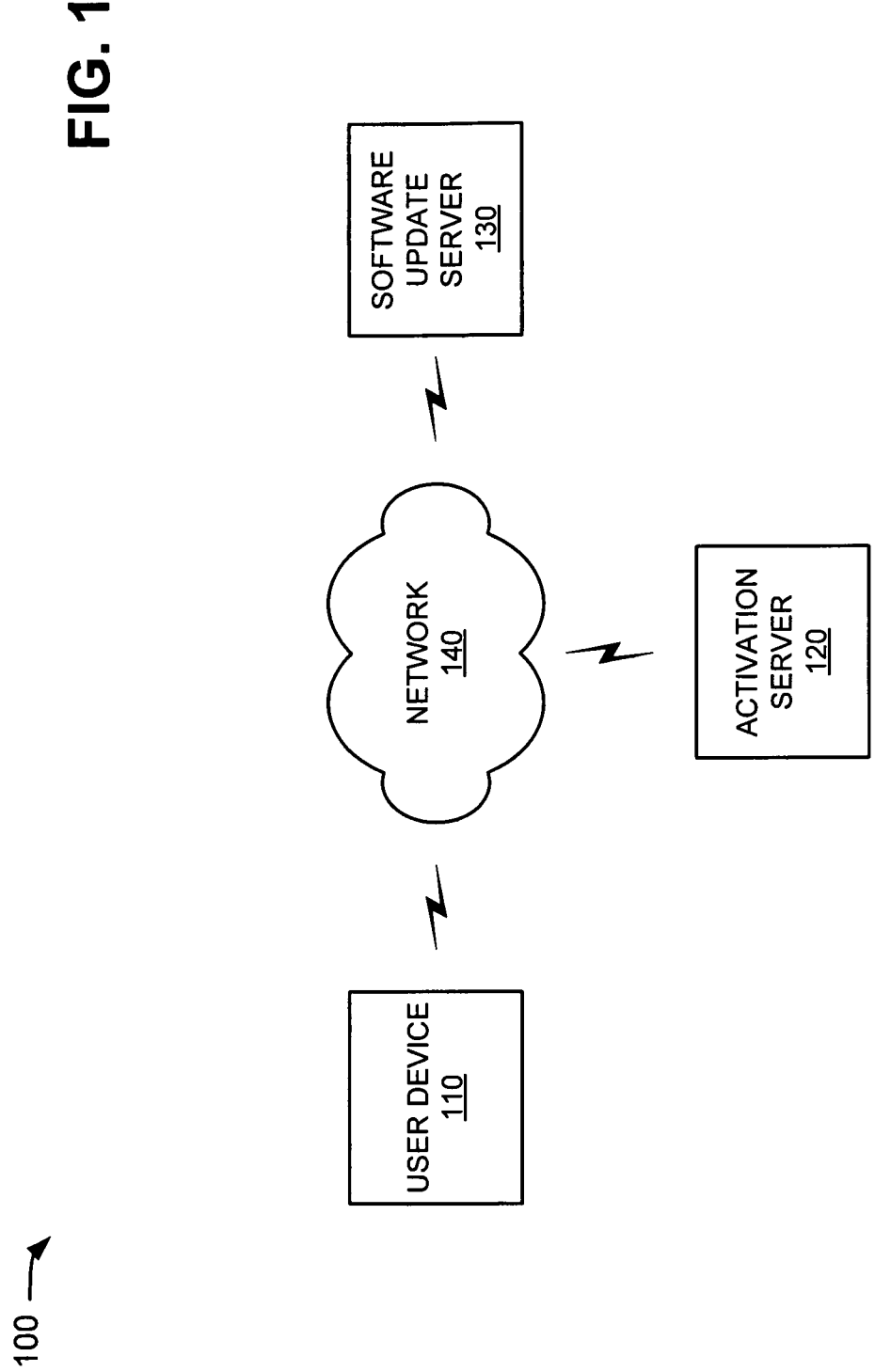

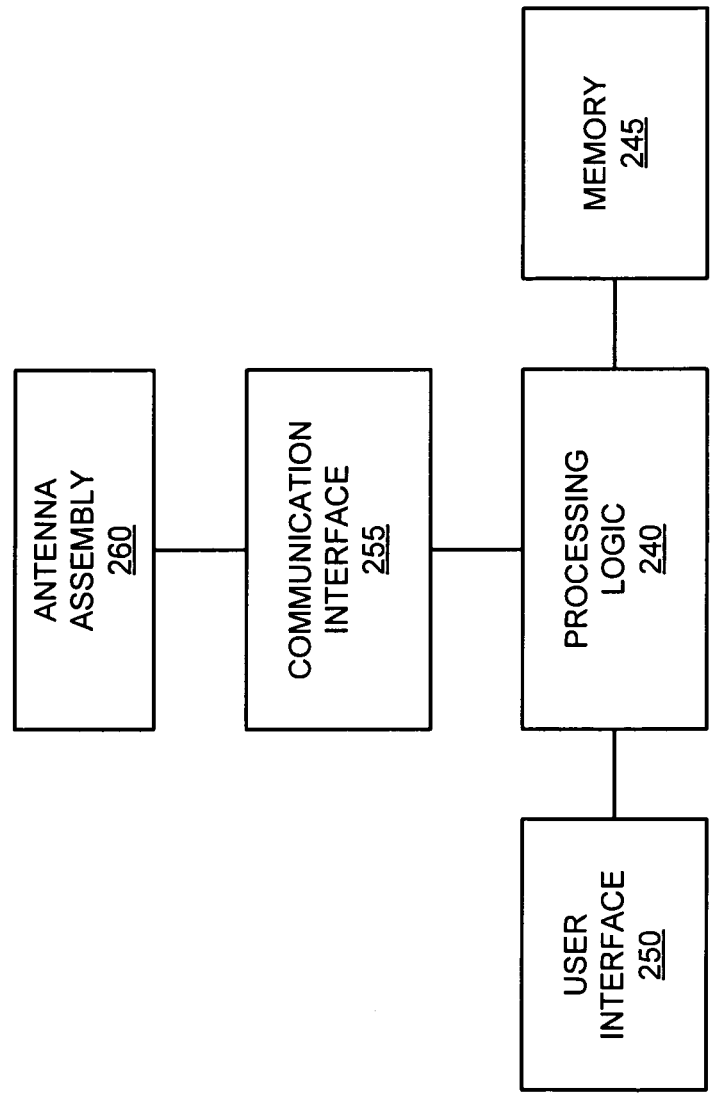

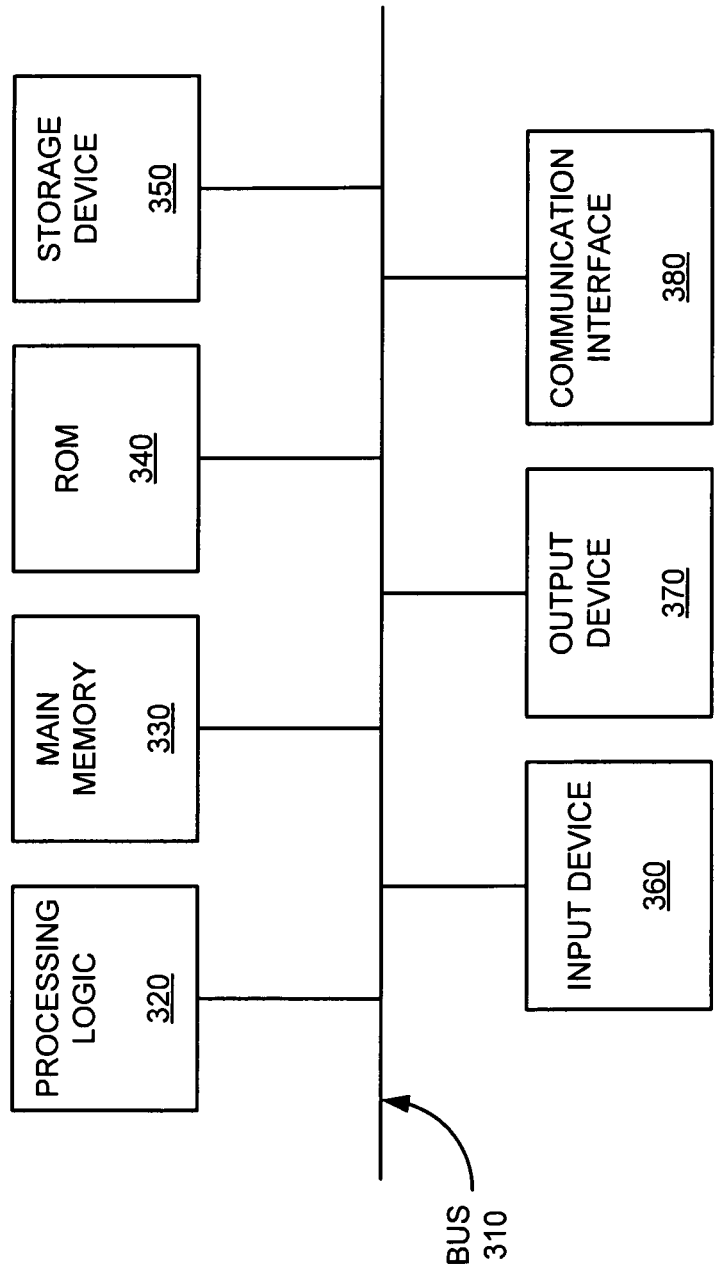

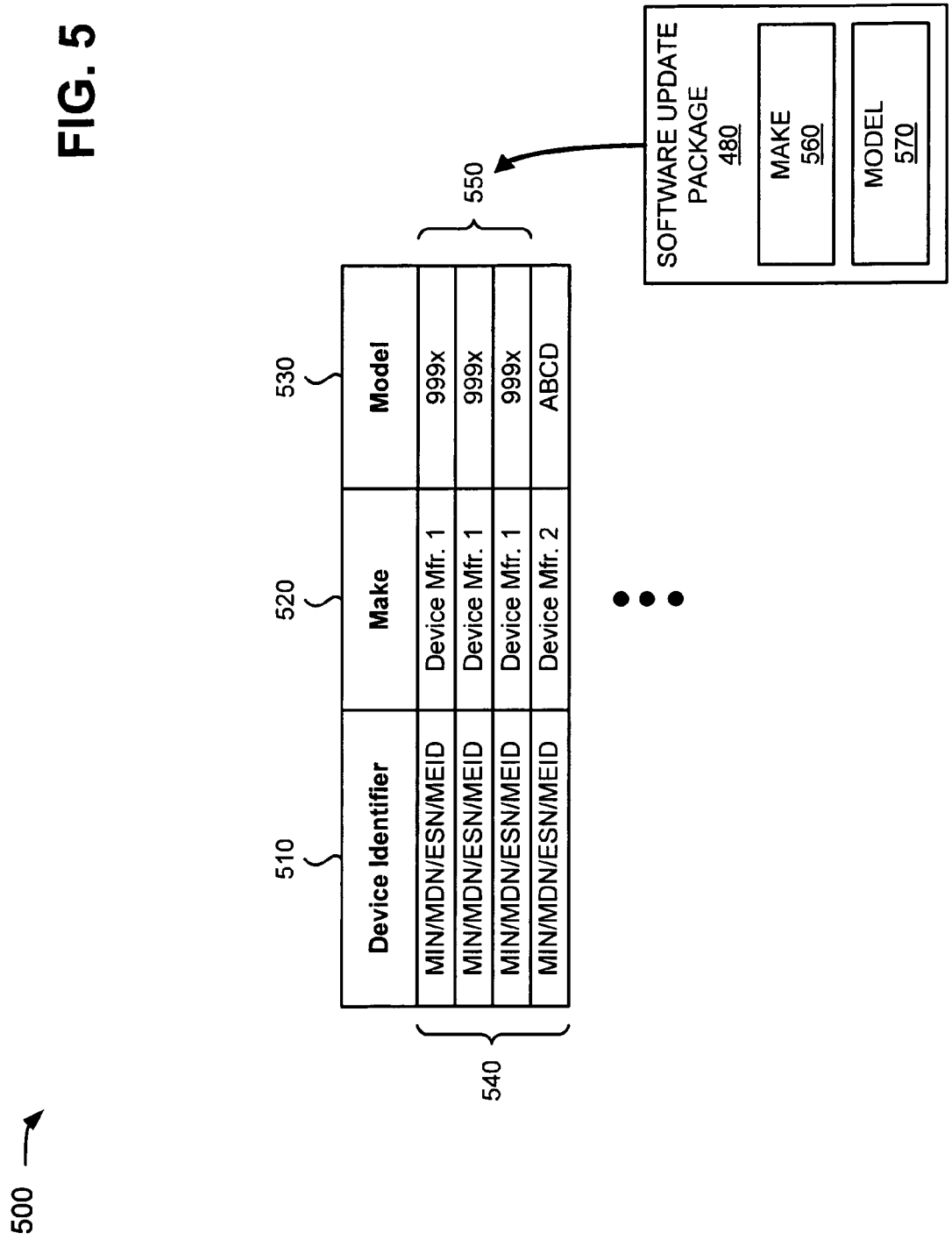

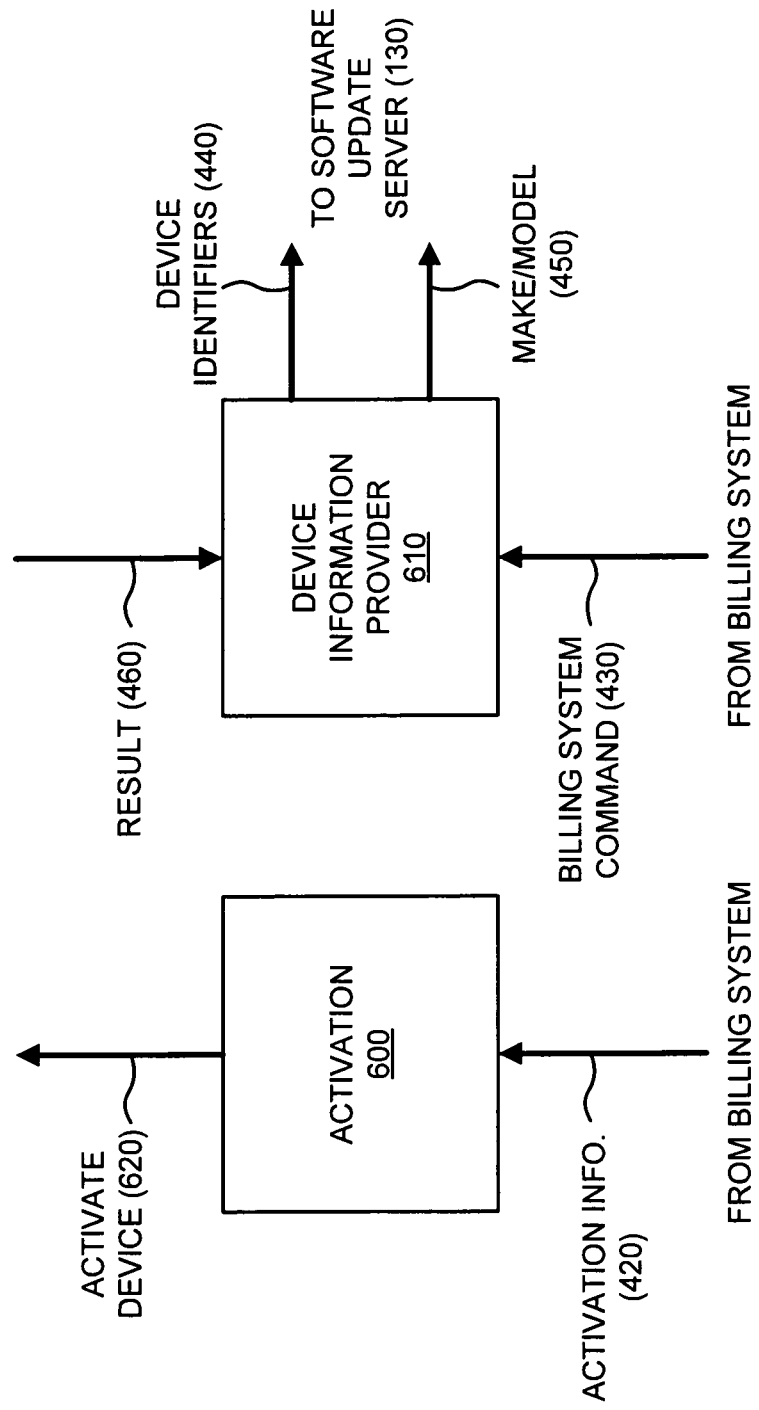

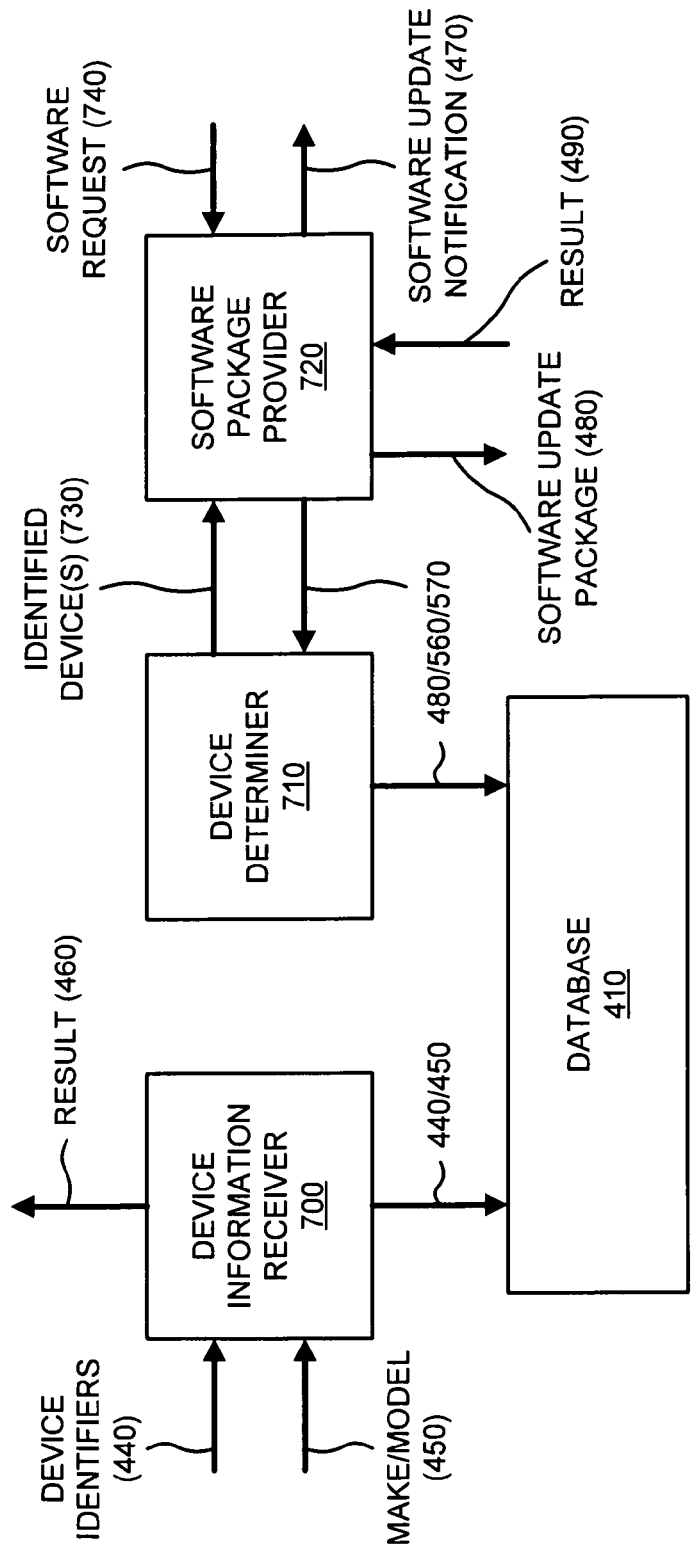

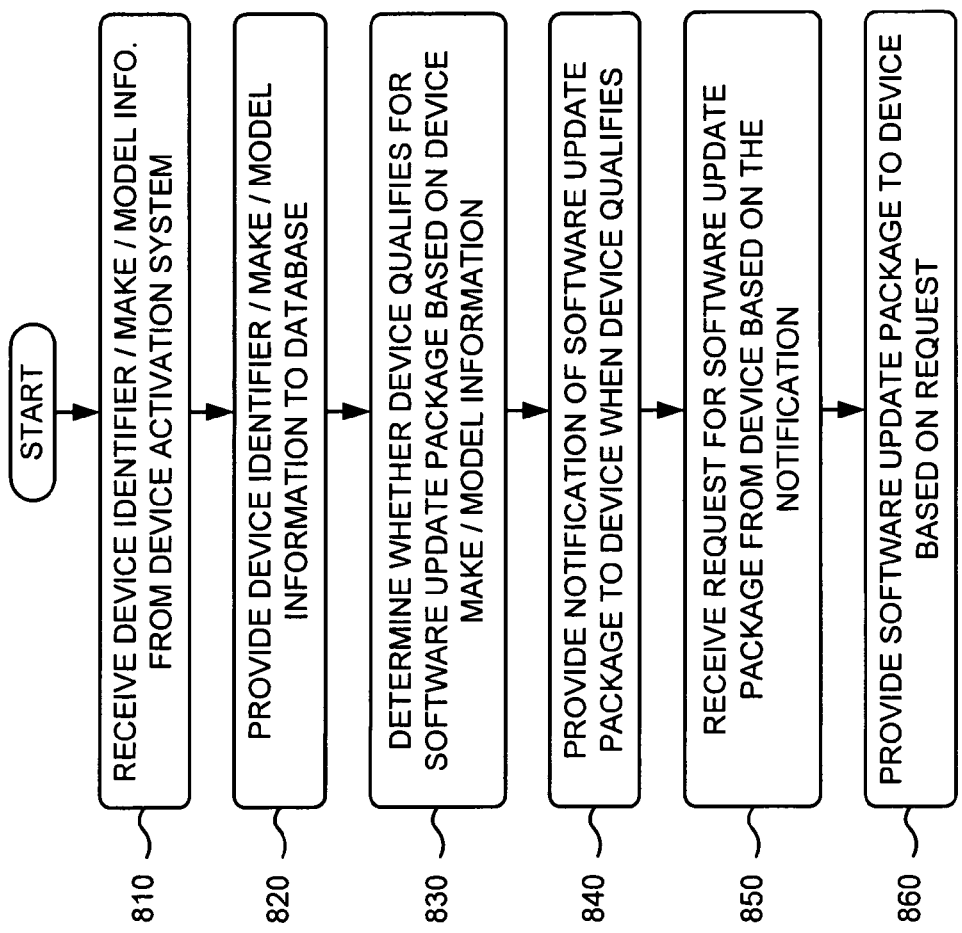

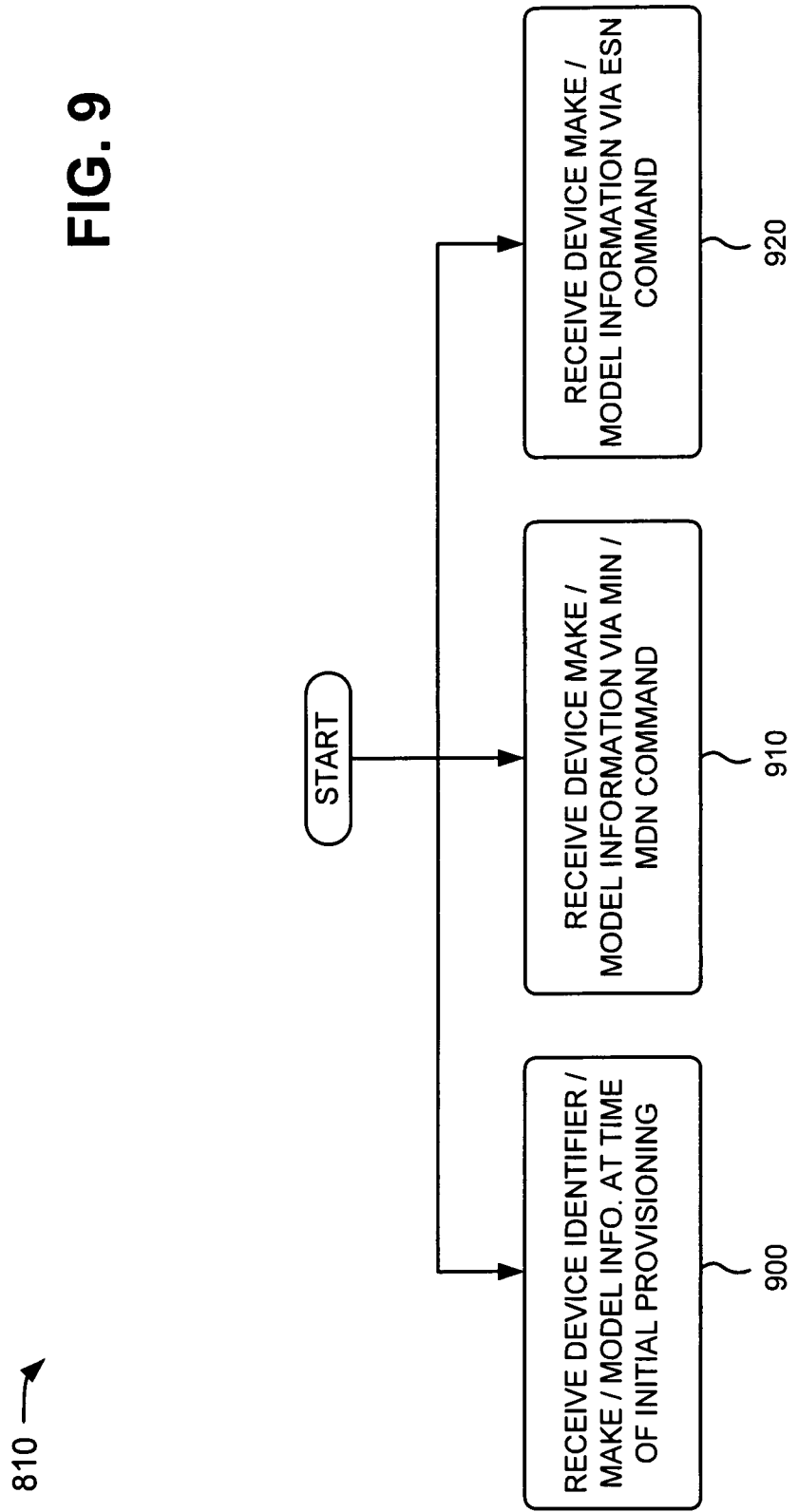

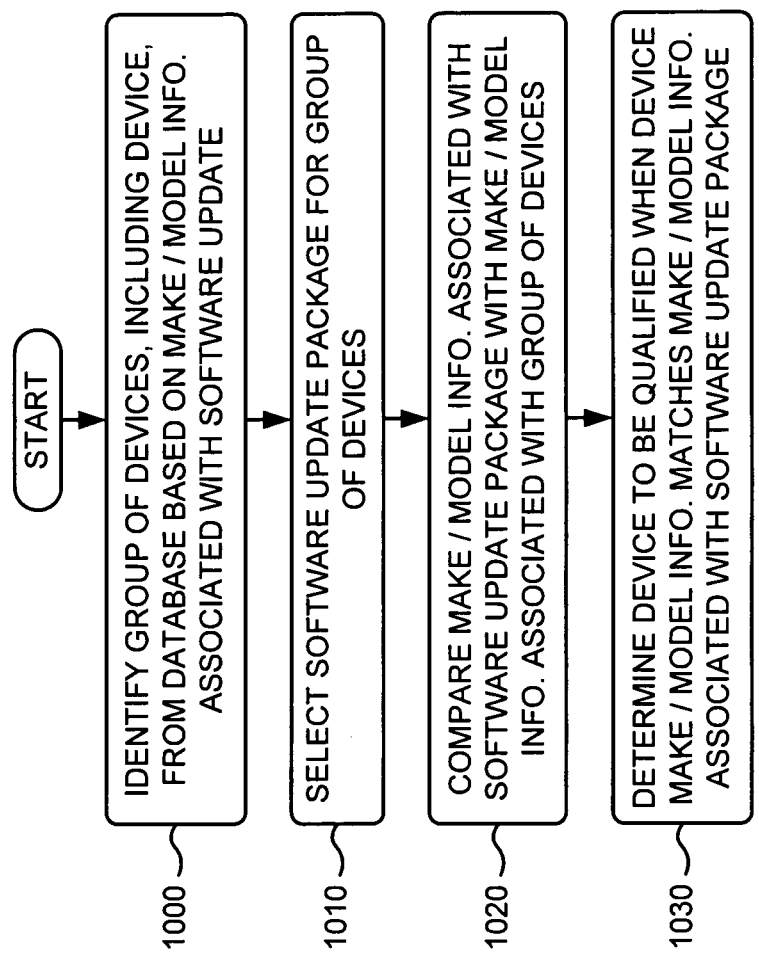

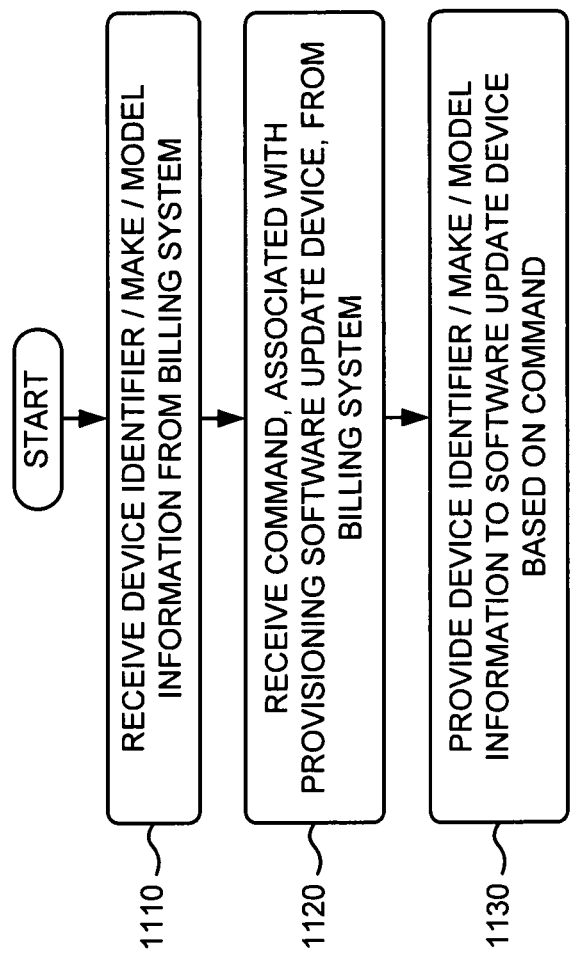

PROVISIONING DEVICE MAKE AND MODEL INFORMATION FOR FIRMWARE OVER-THE-AIR (FOTA)

BACKGROUND

Firmware over-the-air (FOTA) enables software (e.g., software updates and/or upgrades) to be provided to mobile devices, such as mobile telephones and personal digital assistants (PDAs), via a wireless network. Before FOTA, users (or customers) of such mobile devices could obtain a software update from a specific service center (e.g., an in-store software upgrade), or from a personal computer (e.g., by connecting the mobile device to the personal computer and loading the software update via the personal computer). However, both methods are inconvenient, time consuming, and depend on the consumers proactively seeking out the software update. Furthermore, in-store software upgrades may erase customer information from the mobile devices. FOTA provides simple and quick software updates for mobile devices, and preserves customer information on the mobile devices.

When an activation system activates a mobile device, the activation system typically provides identifier information associated with the mobile device (e.g., a mobile identification number (MIN), a mobile directory number (MDN), an electronic serial number (ESN), a mobile equipment identity (MEID), etc.) to a system (e.g., a server) providing FOTA data. However, the FOTA system also needs make (e.g., a manufacturer of) and model information associated with the mobile device so that the mobile device may be targeted for software updates when appropriate. After an activation process (e.g., via a "*228" activation) in which a new MIN is programmed into the mobile device, the FOTA system receives the make and/or model information of a mobile device by communicating with the mobile device (e.g., via a data session), and receiving the make and/or model information directly from the device. However, if the data session is unsuccessful or the mobile device is not properly activated, the make and/or model information of the mobile device will not be received by the FOTA system. When the make and/or model information is not available for a mobile device in the FOTA system, that mobile device cannot be targeted (e.g., as part of a mass update campaign) by the FOTA system for software updates. This is because the FOTA system uses the make and/or model information to identify mobile devices for software updates. Thus, if this information is missing for a specific mobile device, the FOTA system will be unable to identify the specific mobile device, and will be unable to notify the specific mobile device of the software update.

BRIEF DESCRIPTION OF THE DRAWINGS

FIG. 1 depicts a diagram of an exemplary network in which systems and methods described herein may be implemented;

FIGS. 2A and 2B illustrate exemplary components of a user device of the network depicted in FIG. 1;

FIG. 3 depicts exemplary components of an activation server and/or a software update server of the network illustrated in FIG. 1;

FIG. 5 depicts a diagram of a portion of an exemplary database capable of being provided in and/or managed by the software update server of the network illustrated in FIG. 1;

FIG. 6 illustrates a diagram of exemplary functional components of the activation server of the network depicted in FIG. 1;

FIG. 7 depicts a diagram of exemplary functional components of the software update server of the network illustrated in FIG. 1; and FIGS. 8-11 illustrate flow charts of exemplary processes according to implementations described herein.

DETAILED DESCRIPTION OF PREFERRED EMBODIMENTS

Figure 2A:
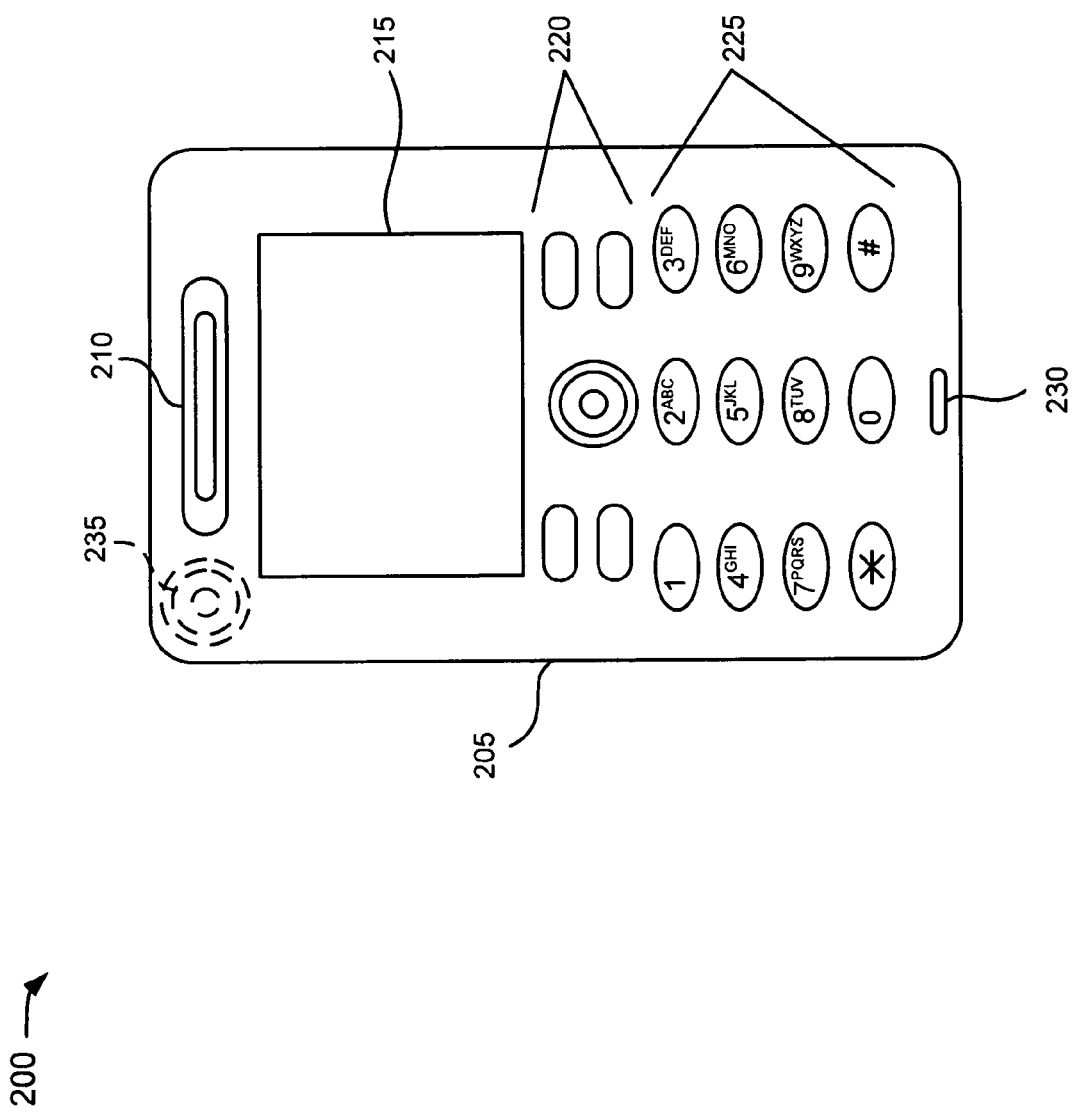

The following detailed description refers to the accompanying drawings. The same reference numbers in different drawings may identify the same or similar elements. Also, the following detailed description does not limit the invention.

Systems and/or methods described herein may provide (e.g., via an activation server) make and/or model information associated with a user device (e.g., a mobile telephone, a PDA, etc.) to a software update server (e.g., a FOTA system) during activation of the user device. The systems and/or methods may enable the user device to be targeted (e.g., by the software update server) for software updates via the make and/or model information. In one implementation, for example, the systems and/or methods may receive identifier, make, and/or model information associated with a device (e.g., a user device) from a device activation system (e.g., an activation server), and may provide the device identifier, make, and/or model information to a database. The systems and/or methods may determine whether the device qualifies for a software update package based on the device make and/or model information, and may provide, to the device, a notification of the software update package when the device qualifies. The systems and/or methods may receive a request for the software update package from the device based on the notification, and may provide the software update package to the device based on the request.

Systems and/or methods described herein may eliminate the need to establish a data session with the user device to obtain the device make and/or model information, may enable one or more user devices to be targeted for batch software updates, and may eliminate the need for periodic notifications associated with batch software updates.

FIG. 1 is a diagram of an exemplary network 100 in which systems and methods described herein may be implemented. As illustrated, network 100 may include a user device 110, an activation server 120, and a software update server 130 interconnected by a network 140. Components of network 100 may interconnect via wired and/or wireless connections. A single user device, activation server, software update server, and network have been illustrated in FIG. 1 for simplicity. In practice, there may be more user devices, activation servers, software update servers, and/or networks. Also, in some instances, one or more of the components of network 100 may perform one or more functions described as being performed by another one or more of the components of network 100.

User device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a lap top, a personal computer, or other types of computation or communication devices, threads or processes running on these devices, and/or objects executable by these devices. In one implementation, user device 110 may include any device capable of being activated by activation server 120 and/or capable of receiving software updates (e.g., FOTA) from software update server 130.

Activation server 120 may include one or more server entities, or other types of computation or communication devices, that gather, process, search, and/or provide information in a manner described herein. In one implementation, activation server 120 may include a server (e.g., a computer system or an application) capable of activating user device 110 for connectivity with a network (e.g., network 110). In one example, activation server 120 may include a server (e.g., a computer system or an application) capable of providing identifier, make, and/or model information associated with user device 110 to software update server 130 when user device 110 is activated by activation server 120 (e.g., at a time of initial provisioning of user device 110 and/or software update server 130).

Software update server 130 may include one or more server entities, or other types of computation or communication devices, that gather, process, search, and/or provide information in a manner described herein. In one implementation, software update server 130 may include a server (e.g., a computer system or an application) capable of providing one or more software update packages, firmware (e.g., FOTA), etc. to user device 110 via a network (e.g., network 100). In one example, software update server 130 may include a server (e.g., a computer system or an application) capable of receiving identifier, make, and/or model information associated with user device 110 from activation server 120 when user device 110 is activated by activation server 120. Software update server 130 may use the make and/or model information to determine whether user device 110 qualifies for a software update package, and may provide, to user device 110, a notification of the software update package when user device 110 qualifies.

Network 140 may include a local area network (LAN), a wide area network (WAN), a metropolitan area network (MAN), a Public Land Mobile Network (PLMN), a telephone network, such as the Public Switched Telephone Network (PSTN), a cellular telephone network, an intranet, the Internet, or a combination of networks.

FIGS. 2A and 2B illustrate exemplary components of a device 200 that may correspond to user device 110. As illustrated in FIG. 2A, device 200 may include a housing 205, a speaker 210, a display 215, control buttons 220, a keypad 225, a microphone 230, and/or a camera 235. Housing 205 may protect the components of device 200 from outside elements. Speaker 210 may provide audible information to a user of device 200.

Display 215 may provide visual information to the user. For example, display 215 may display text input into device 200, text, images, video, and/or graphics received from another device, and/or information regarding incoming or outgoing calls or text messages, emails, media, games, phone books, address books, the current time, etc. In one exemplary implementation, display 215 may provide act as a viewfinder that may aid user device 110 in capturing and/or storing video and/or images. Control buttons 220 may permit the user to interact with device 200 to cause device 200 to perform one or more operations. For example, control buttons 220 may be used to cause device 200 to transmit information. Keypad 225 may include a standard telephone keypad. Microphone 230 may receive audible information from the user. Camera 235 may be provided on a back side of device 200, and may enable device 200 to capture and/or store video and/or images (e.g., pictures).

As illustrated in FIG. 2B, device 200 may further include processing logic 240, memory 245, a user interface 250, a communication interface 255, and/or an antenna assembly 260.

Processing logic 240 may include a processor, a microprocessor, an application specific integrated circuit (ASIC), a field programmable gate array (FPGA), or the like. Processing logic 240 may control operation of device 200 and its components. In one implementation, processing logic 240 may control operation of components of device 200 in a manner described herein.

Memory 245 may include a random access memory (RAM), a read-only memory (ROM), and/or another type of memory to store data and instructions that may be used by processing logic 240.

User interface 250 may include mechanisms for inputting information to device 200 and/or for outputting information from device 200. Examples of input and output mechanisms might include buttons (e.g., control buttons 220, keys of keypad 225, a joystick, etc.) or a touch screen interface to permit data and control commands to be input into device 200; a speaker (e.g., speaker 210) to receive electrical signals and output audio signals; a microphone (e.g., microphone 230) to receive audio signals and output electrical signals; a display (e.g., display 215) to output visual information (e.g., text input into device 200); a vibrator to cause device 200 to vibrate; and/or a camera (e.g., camera 235) to receive video and/or images.

Communication interface 255 may include, for example, a transmitter that may convert baseband signals from processing logic 240 to wireless (e.g., radio frequency (RF)) signals and/or a receiver that may convert wireless (e.g., RF) signals to baseband signals. Alternatively, communication interface 255 may include a transceiver to perform functions of both a transmitter and a receiver. Communication interface 255 may connect to antenna assembly 260 for transmission and/or reception of the wireless (e.g., RF) signals.

Antenna assembly 260 may include one or more antennas to transmit and/or receive signals over the air. Antenna assembly 260 may, for example, receive RF signals from communication interface 255 and transmit them over the air, and receive RF signals over the air and provide them to communication interface 255. In one implementation, for example, communication interface 255 may communicate with a network (e.g., network 100) and/or devices connected to a network.

As described herein, device 200 may perform certain operations in response to processing logic 240 executing software instructions of an application contained in a computer-readable medium, such as memory 245. A computer-readable medium may be defined as a physical or logical memory device. The software instructions may be read into memory 245 from another computer-readable medium or from another device via communication interface 255. The software instructions contained in memory 245 may cause processing logic 240 to perform processes that described herein. Alternatively, hardwired circuitry may be used in place of or in combination with software instructions to implement processes described herein. Thus, implementations described herein are not limited to any specific combination of hardware circuitry and software.

Although FIGS. 2A and 2B show exemplary components of device 200, in other implementations, device 200 may contain fewer, different, or additional components than depicted in FIGS. 2A and 2B. In still other implementations, one or more components of device 200 may perform one or more tasks described as being performed by one or more other components of device 200.

FIG. 3 is an exemplary diagram of a device 300 that may correspond to any of activation server 120 and/or software update server 130. As illustrated, device 300 may include a bus 310, processing logic 320, a main memory 330, a read-only memory (ROM) 340, a storage device 350, an input device 360, an output device 370, and/or a communication interface 380. Bus 310 may include a path that permits communication among the components of device 300.

Processing logic 320 may include a processor, microprocessor, or other type of processing logic that may interpret and execute instructions. Main memory 330 may include a random access memory (RAM) or another type of dynamic storage device that may store information and instructions for execution by processing logic 320. ROM 340 may include a ROM device or another type of static storage device that may store static information and/or instructions for use by processing logic 320. Storage device 350 may include a magnetic and/or optical recording medium and its corresponding drive.

Input device 360 may include a mechanism that permits an operator to input information to device 300, such as a keyboard, a mouse, a pen, a microphone, voice recognition and/or biometric mechanisms, etc. Output device 370 may include a mechanism that outputs information to the operator, including a display, a printer, a speaker, etc. Communication interface 380 may include any transceiver-like mechanism that enables device 300 to communicate with other devices and/or systems. For example, communication interface 380 may include mechanisms for communicating with another device or system via a network, such as network 100.

As described herein, device 300 may perform certain operations in response to processing logic 320 executing software instructions contained in a computer-readable medium, such as main memory 330. A computer-readable medium may be defined as a physical or logical memory device. The software instructions may be read into main memory 330 from another computer-readable medium, such as storage device 350, or from another device via communication interface 380. The software instructions contained in main memory 330 may cause processing logic 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows exemplary components of device 300, in other implementations, device 300 may contain fewer, different, or additional components than depicted in FIG. 3. In still other implementations, one or more components of device 300 may perform one or more tasks described as being performed by one or more other components of device 300.

Figure 4:
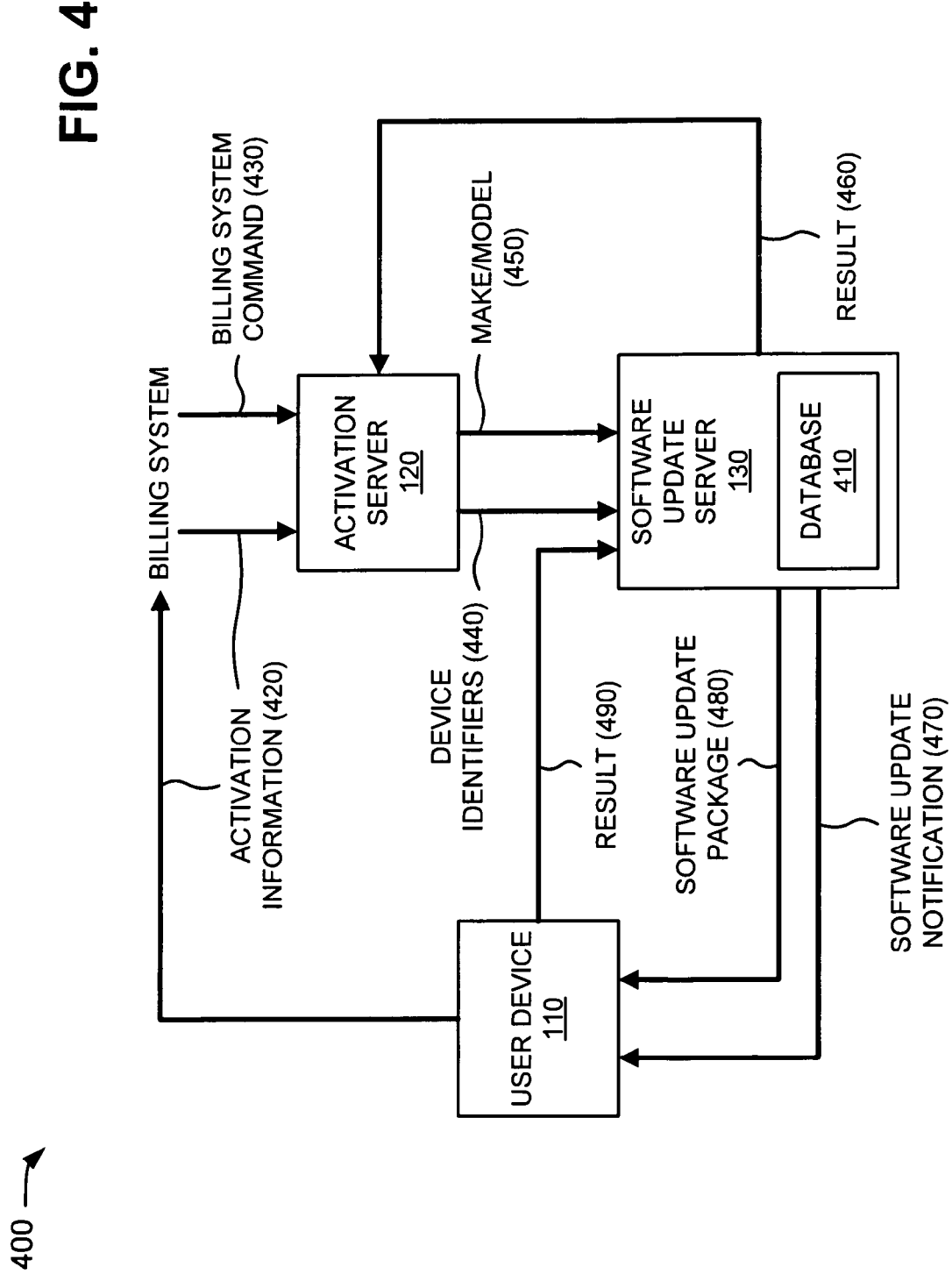
FIG. 4 illustrates a diagram of an exemplary portion of the network depicted in FIG. 1.

FIG. 4 illustrates a diagram of an exemplary portion 400 of network 100. As illustrated, exemplary network portion 400 may include user device 110, activation server 120, and software update server 130. User device 110, activation server 120, and software update server 130 may include the features described above in connection with, for example, FIG. 1. Software update server 130 may include a database 410 (e.g., provided in storage device 350) for storing information associated with user devices (e.g., user device 110).

As further shown in FIG. 4, user device 110 may provide activation information 420 to a billing system (e.g., automatically or activation information 420 may be manually input to the billing system). In one implementation, user device 110 may provide activation information 420 to the billing system in response to activating user device 110 with the billing system. The billing system may receive activation information 420, and may retrieve make information and/or model information, associated with user device 110, from another database (e.g., based on activation information 420). The billing system may associate the make and/or model information of user device 110 with activation information 420. The billing system may provide activation information 420 (e.g., including the make and/or model information of user device 110) to activation server 120. Activation information 420 may include identifier information (e.g., a MIN, a MDN, an ESN, a MEID, etc.) associated with user device 110 when activation information 420 is retrieved from user device 110. When activation information 420 is provided to activation server 120, activation information 420 may further include make information (e.g., a manufacturer of user device 110), model information (e.g., a model number associated with user device 110), etc.

The billing system may be responsible for billing devices (e.g., user device 110) subscribing to services (e.g., a wireless telephone service) provided by a network (e.g., network 100). The billing system may establish billing arrangements (e.g., account information, payment options, etc.) with user device 110, and, after the billing arrangements are established, may provide a billing system command 430 to activation server 120. In one implementation, billing system command 430 may request that activation server 120 provide (e.g., provision) activation information 420 to one or more software update servers (e.g., software update server 130). Although activation information 420 and billing system command 430 are shown separately, in other implementations, activation information 420 and billing system command 430 may be combined and provided to activation server 120.

Activation server 120 may receive activation information 420 and billing system command 430, and may provide activation information 420 (e.g., device identifiers 440 and make/model information 450) to software update server 130. Although device identifiers 440 and make/model information 450 are shown separately, in other implementations, device identifiers 440 and make/model information 450 may be combined and provided to software update server 130. Device identifiers 440 may include a MIN, a MDN, an ESN, a MEID, etc. associated with user device 110. Make/model information 450 may include a manufacturer of user device 110, a model number associated with user device 110, etc. Software update server 130 may receive device identifiers 440 and make/model information 450, and may provide device identifiers 440 and make/model information 450 to database 410 for storage. Software update server 130 may provide a result 460 (e.g., a success, a failure, etc.), associated with receipt and/or storage of device identifiers 440 and make/model information 450, to activation server 120. In one implementation, if software update server 130 unsuccessfully receives and/or stores device identifiers 440 and make/model information 450, activation server 120 may resend device identifiers 440 and make/model information 450 to software update server 130.

In an exemplary implementation, activation server 120 may provide device identifiers 440 and make/model information 450 to software update server 130 during initial provisioning of software update server 130. Alternatively and/or additionally, activation server 120 may provide make/model information 450 to software update server 130 via other mechanisms (e.g., in a MIN/MDN change command, in an ESN change command, etc.).

In one implementation, software update server 130 may include various software updates (e.g., any software, firmware, etc. capable of updating functions associated with user device 110) for a specific device make and model, and may identify one or more groups of devices (e.g., via database 410) based on the specific device make and model. Software update server 130 may select a software update package (e.g., any software update package, firmware, etc. capable of updating functions associated with user device 110), from the various software updates, for targeting the one or more groups of devices. Software update server 130 may compare make/model information associated with the software update package with make/model information associated with the devices in the identified one or more groups. Software update server 130 may determine device(s) in the identified one or more groups to be qualified for the software update package when the make/model information associated with the software update package matches the make/model information associated with the device(s) in the identified one or more groups.

As further shown in FIG. 4, software update server 130 may provide a software update notification 470 to the qualified device(s) (e.g., user device 110) identified by software update server 130. Software update notification 470 may include information identifying one or more software update packages provided by software update server 130. In one implementation, user device 110 may receive software update notification 470, and may provide a request for a software update package 480 to software update server 130. As described above, software update package 480 may include any software update package, firmware, etc. capable of updating functions associated with user device 110. Software update server 130 may make software update package 480 available to user device 110 for downloading, and user device 110 may download software update package 480. After downloading and installing software update package 480, user device 110 may report a result 490 (e.g., a success, a failure, etc.), associated with the update, to software update server 130. Alternatively, software update server 130 may unilaterally transmit (or "push") software update package 480 to user device 110 based on, for example, a user-defined preference or priority associated with software update package 480.

Although FIG. 4 show exemplary components of network portion 400, in other implementations, network portion 400 may contain fewer, different, or additional components than depicted in FIG. 4. In still other implementations, one or more components of network portion 400 may perform one or more tasks described as being performed by one or more other components of network portion 400.

FIG. 5 depicts a diagram of a portion 500 of an exemplary database (e.g., of database 410) capable of being provided in and/or managed by software update server 130. In one implementation, the information provided in database portion 500 may be provided by activation server 120 to software update server 130 when activation server 120 provides device identifiers 440 and make/model information 450 to software update server 130. As illustrated, database portion 500 may include a variety of information associated with user devices (e.g., user device 110). For example, database portion 500 may include a device identifier field 510, a make field 520, a model field 530, and/or a variety of entries 540 associated with fields 510-530.

Device identifier field 510 may include entries 540 providing identifier information (e.g., MINs, MDNs, ESNs, MEIDs, etc.) associated with user devices. For example, device identifier field 510 may include entries 540 for "MIN/MDN/ESN/MEID," etc. associated with user devices.

Make field 520 may include entries 540 providing make (or manufacturer) information associated with the device identifiers provided in device identifier field 510. For example, make field 520 may indicate that three of the device identifiers "MIN/MDN/ESN/MEID" (e.g., provided in device identifier field 510) are made by a first device manufacturer (e.g., "Device Mfr. 1"), and that one of the device identifiers "MIN/MDN/ESN/MEID" (e.g., provided in device identifier field 510) are made by a second device manufacturer (e.g., "Device Mfr. 2").

Model field 530 may include entries 540 providing model information associated with the device identifiers provided in device identifier field 510. For example, model field 530 may indicate that three of the device identifiers "MIN/MDN/ESN/MEID" (e.g., provided in device identifier field 510) include a model number (e.g., "999x"), and that one of the device identifiers "MIN/MDN/ESN/MEID" (e.g., provided in device identifier field 510) includes another model number (e.g., "ABCD").

As further shown in FIG. 5, software update server 130 may identify a group 550 of devices (e.g., via database portion 500) based on the specific device make and model. For example, group 550 may include user devices made by the first device manufacturer (e.g., "Device Mfr. 1") that include a specific model number (e.g., "999x"). Software update server 130 may select a software update package (e.g., software update package 480), from the various software updates, for targeting the devices identified by group 550. Software update server 130 may compare make information 560 and/or model information 570 associated with software update package 480 with make/model information associated with the devices identified by group 550. Software update server 130 may determine device(s) in group 550 to be qualified for software update package 480 when make information 560 and/or model information 570 associated with software update package 480 matches the make/model information associated with the device(s) identified by group 550. In one implementation, software update package, make information 560, and model information 570 may be provided in database portion 500.

Although FIG. 5 shows exemplary information that may be provided in database portion 500, in other implementations, database portion 500 may contain fewer, different, or additional information than depicted in FIG. 5.

FIG. 6 illustrates a diagram of exemplary functional components of activation server 120. As illustrated, activation server 120 may include activation logic 600 and device information provider logic 610. The functions described in FIG. 6 may be performed by one or more of the exemplary components of device 300 depicted in FIG. 3.

Activation logic 600 may include any hardware, software, or combination of hardware and software based logic (e.g., processing logic 320) that enables activation server 120 to receive activation information 420 from the billing system, as described above in connection with, for example, FIG. 4. In one implementation, activation logic 600 may receive activation information 420, and may activate user device 110, as indicated by reference number 620, based on the received activation information 420. For example, activation logic 600 may activate user device 110 by enabling user device 110 to utilize services (e.g., telecommunication services) provided by a network (e.g., network 100).

Device information provider logic 610 may include any hardware, software, or combination of hardware and software based logic (e.g., processing logic 320) that enables activation server 120 to receive billing system command 430 from the billing system, and to provide device identifiers 440 and make/model information 450 to software update server 130 based on billing system command 430. In one example, billing system command 430 may request that device information provider logic 610 provide (e.g., provision) device identifiers 440 and make/model information 450 to software update server 130. Device information provider logic 610 may receive result 460 (e.g., a success, a failure, etc.), associated with receipt and/or storage of device identifiers 440 and make/model information 450, from software update server 130.

Although FIG. 6 shows exemplary functional components of activation server 120, in other implementations, activation server 120 may contain fewer, different, or additional functional components than depicted in FIG. 6. In still other implementations, one or more functional components of activation server 120 may perform one or more tasks described as being performed by one or more other functional components of activation server 120.

FIG. 7 depicts a diagram of exemplary functional components of software update server 130. As illustrated, software update server 130 may include device information receiver logic 700, device determiner logic 710, and software package provider logic 720. The functions described in FIG. 7 may be performed by one or more of the exemplary components of device 300 depicted in FIG. 3.

Device information receiver logic 700 may include any hardware, software, or combination of hardware and software based logic (e.g., processing logic 320) that enables software update server 130 to receive device identifiers 440 and make/model information 450 from activation server 120, and to provide device identifiers 440 and make/model information 450 to database 410 for storage. In one implementation, device information receiver logic 700 may provide result 460 (e.g., a success, a failure, etc.), associated with receipt and/or storage of device identifiers 440 and make/model information 450 in database 410, to activation server 120.

Device determiner logic 710 may include any hardware, software, or combination of hardware and software based logic (e.g., processing logic 320) that receives software update package 480 (and its associated make information 560 and/or model information 570) from software package provider logic 720, and compares software update package 480 (and its associated make information 560 and/or model information 570) with information provided in database 410. For example, device determiner logic 710 may compare make information 560 and/or model information 570 associated with software update package 480 with make/model information provided in database 410. Device determiner logic 710 may identify device(s) 730 in database 410 to be qualified for software update package 480 when make information 560 and/or model information 570 associated with software update package 480 matches the make/model information associated with identified device(s) 730. Device determiner logic 710 may provide identified device(s) 730 to software package provider logic 720.

Software package provider logic 720 may include any hardware, software, or combination of hardware and software based logic (e.g., processing logic 320) that provides software update package 480 (and its associated make information 560 and/or model information 570) to device determiner logic 710, and receives identified device(s) 730 from device determiner logic 710. Software package provider logic 720 may provide software update notification 470 to identified device(s) 730 (e.g., to user device 110), and may receive a request 740 for software update package 480 from user device 110 based on software update notification 470. Software package provider logic 720 may make software update package 480 available to user device 110 for downloading, and user device 110 may download software update package 480 via software package provider logic 720. After downloading and installing software update package 480, user device 110 may report result 490 (e.g., a success, a failure, etc.) associated with the update to software package provider logic 720.

Although FIG. 7 shows exemplary functional components of software update server 130, in other implementations, software update server 130 may contain fewer, different, or additional functional components than depicted in FIG. 7. In still other implementations, one or more functional components of software update server 130 may perform one or more tasks described as being performed by one or more other functional components of software update server 130.

FIGS. 8-10 illustrate flow charts of an exemplary process 800 for utilizing make and/or model information associated with a user device, according to implementations described herein. In one implementation, process 800 may be performed by software update server 130. In another implementation, some or all of process 800 may be performed by another device or group of devices, including or excluding software update server 130.

As illustrated in FIG. 8, process 800 may begin with receipt of identifier, make, and/or model information associated with a device from a device activation system (block 810), and providing the device identifier, make, and/or model information to a database (block 820). For example, in implementations described above in connection with FIG. 4, software update server 130 may receive device identifiers 440 and make/model information 450, and may provide device identifiers 440 and make/model information 450 to database 410 for storage. Device identifiers 440 may include a MIN, a MDN, an ESN, a MEID, etc. associated with user device 110. Make/model information 450 may include a manufacturer of user device 110, a model number associated with user device 110, etc.

As further shown in FIG. 8, whether the device qualifies for a software update package may be determined based on the device make and/or model information (block 830), and a notification associated with the software update package may be provided to the device when the device qualifies (block 840). For example, in implementations described above in connection with FIG. 4, software update server 130 may include various software updates for a specific device make and model, and may identify one or more groups of devices (e.g., via database 410) based on the specific device make and model. Software update server 130 may select a software update package, from the various software updates, for targeting the one or more groups of devices. Software update server 130 may compare make/model information associated with the software update package with make/model information associated with the devices in the identified one or more groups. Software update server 130 may determine device(s) in the identified one or more groups to be qualified for the software update package when the make/model information associated with the software update package matches the make/model information associated with the device(s) in the identified one or more groups. Software update server 130 may provide software update notification 470 to the qualified device(s) (e.g., user device 110) identified by software update server 130.

Returning to FIG. 8, a request for the software update package may be received from the device based on the notification (block 850), and the software update package may be provided to the device based on the request (block 860). For example, in implementations described above in connection with FIG. 7, software package provider logic 720 of software update server 130 may provide software update notification 470 to identified device(s) 730 (e.g., to user device 110), and may receive request 740 for software update package 480 from user device 110 based on software update notification 470. Software package provider logic 720 may make software update package 480 available to user device 110 for downloading, and user device 110 may download software update package 480 via software package provider logic 720.

Process block 810 may include the process blocks depicted in FIG. 9. As shown in FIG. 9, process block 810 may include receiving the device identifier, make, and/or model information at a time of initial provisioning (block 900), receiving the device identifier, make, and/or model information via a MIN/MDN command (block 910), and/or receiving the device identifier, make, and/or model information via an ESN command (block 920). For example, in implementations described above in connection with FIG. 4, activation server 120 may provide device identifiers 440 and make/model information 450 to software update server 130 during initial provisioning of software update server 130. Alternatively and/or additionally, activation server 120 may provide make/model information 450 to software update server 130 via other mechanisms (e.g., in a MIN/MDN change command, in an ESN change command, etc.).

Process block 830 may include the process blocks depicted in FIG. 10. As shown in FIG. 10, process block 830 may include identifying a group of devices, including the device, from the database based on make and/or model information associated with a software update (block 1000), and selecting the software update package for the group of devices (block 1010). For example, in implementations described above in connection with FIG. 4, software update server 130 may include various software updates for a specific device make and model, and may identify one or more groups of devices (e.g., via database 410) based on the specific device make and model. Software update server 130 may select a software update package, from the various software updates, for targeting the one or more groups of devices.

As further shown in FIG. 10, process block 830 may include comparing make and/or model information associated with the software update package with the make and/or model information associated with the group of devices (block 1020), and determining the device to be qualified when the device make and/or model information matches the make and/or model information associated with the software update package (block 1030). For example, in implementations described above in connection with FIG. 4, software update server 130 may compare make/model information associated with the software update package with make/model information associated with the devices in the identified one or more groups. Software update server 130 may determine device(s) in the identified one or more groups to be qualified for the software update package when the make/model information associated with the software update package matches the make/model information associated with the device(s) in the identified one or more groups.

FIG. 11 illustrates a flow chart of an exemplary process 1100 for providing make and/or model information associated with a user device, according to implementations described herein. In one implementation, process 1100 may be performed by activation server 120. In another implementation, some or all of process 1100 may be performed by another device or group of devices, including or excluding activation server 120.

As illustrated in FIG. 11, process 1100 may begin with receipt of device identifier, make, and/or model information from a billing system (block 1110). For example, in implementations described above in connection with FIG. 4, user device 110 may provide activation information 420 to a billing system, and the billing system may provide activation information 420 to activation server 120. Activation information 420 may include identifier information (e.g., a MIN, a MDN, an ESN, a MEID, etc. associated with user device 110), make information (e.g., a manufacturer of user device 110), model information (e.g., a model number associated with user device 110), etc. The billing system may be responsible for billing devices (e.g., user device 110) subscribing to services (e.g., a wireless telephone service) provided by a network (e.g., network 100)).

As further shown in FIG. 11, a command, associated with provisioning a software update device, may be received from the billing system (block 1120), and the device identifier, make, and/or model information may be provided to the software update device based on the command (block 1130). For example, in implementations described above in connection with FIG. 4, the billing system may establish billing arrangements (e.g., account information, payment options, etc.) with user device 110, and, after the billing arrangements are established, may provide billing system command 430 to activation server 120. In one example, billing system command 430 may request that activation server 120 provide (e.g., provision) activation information 420 to software update server 130. Activation server 120 may receive billing system command 430, and may provide activation information 420 (e.g., device identifiers 440 and make/model information 450) to software update server 130.

Systems and/or methods described herein may provide make and/or model information associated with a user device to a software update server during activation of the user device. The systems and/or methods may enable the user device to be targeted for software updates via the make and/or model information. In one implementation, for example, the systems and/or methods may receive identifier, make, and/or model information associated with a device from a device activation system, and may provide the device identifier, make, and/or model information to a database. The systems and/or methods may determine whether the device qualifies for a software update package based on the device make and/or model information, and may provide, to the device, a notification of the software update package when the device qualifies. The systems and/or methods may receive a request for the software update package from the device based on the notification, and may provide the software update package to the device based on the request.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 8-11, the order of the blocks may be modified in other implementations. Further, non-dependent blocks may be performed in parallel.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that software and control hardware may be designed to implement the embodiments based on the description herein.

Further, certain portions of the invention may be implemented as "logic" that performs one or more functions. This logic may include hardware, such as an application specific integrated circuit or a field programmable gate array, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "tone" or similar language is used. Further, the phrase "based on" is intended to mean "based, at least in part, on" unless explicitly stated otherwise.

What is claimed is:

1. A method, comprising:
receiving by a first device and at a first time:
make information identifying a make associated with a second device, and model information identifying a model associated with the second device,
the first device being different than the second device,
the make information and the model information being received from a third device as part of the third device activating the second device,
the third device being different than the first device and the second device;
providing, by the first device and to the third device, a result associated with receiving the make information and the model information at the first time;
receiving, by the first device and from the third device, the make information and the model information at a second time, after providing the result, when the result indicates that the make information and the model information were not stored in a memory of the first device;
storing, by the first device and in the memory of the first device, the make information and the model information received at the first time or at the second time;
determining, by the first device and after storing the make information and the model information, whether the second device qualifies for a software update package based on the make information and the model information,
the software update package being associated with:
particular make information identifying a make associated with one or more devices, and
particular model information identifying a model associated with the one or more devices,
determining whether the second device qualifies for the software update package including:
comparing the particular make information and the particular model information with the make information and the model information;
determining, by the first device, that the second device qualifies for the software update package when the particular make information and the particular model information match the make information and the model information; and
providing, by the first device and to the second device, a notification of the software update package based on determining that the second device qualifies for the software update package.

2. The method of claim 1, further comprising:
receiving, from the second device, a request for the software update package based on the notification; and
providing the software update package to the second device based on the request.

3. The method of claim 2, further comprising:
receiving, from the second device, a result associated with providing the software update package to the second device.

4. The method of claim 1, where receiving the make information and the model information comprises at least one of:

receiving, from the third device, identification information of the second device, the make information, and the model information at a time of initial provisioning of the first device;
receiving, from the third device, identification information of the second device, the make information, and the model information via a mobile identification number (MIN) command;
receiving, from the third device, identification information of the second device, the make information, and the model information via a mobile directory number (MDN) command; or
receiving, from the third device, identification information of the second device, the make information, and the model information via an electronic serial number (ESN) command.

5. The method of claim 1, where determining whether the second device qualifies for the software update package further comprises:
identifying information associated with a group of devices, including the second device, from the memory based on make information and model information associated with a software update,
the software update package being associated with the software update;
selecting the software update package for the group of devices;
comparing the particular make information and the particular model information, associated with the software update package, with make information and model information associated with the group of devices; and
determining that the second device qualifies for the software update package when the make information and the model information, associated with the group of devices, match the particular make information and the particular model information associated with the software update package.

6. The method of claim 1, where the first device comprises a server that updates software, and
where the second device comprises one or more of:
a radiotelephone;
a personal communications system (PCS) terminal;
a personal digital assistant (PDA);
a lap top; or
a personal computer.

7. The method of claim 1, further comprising:
selecting a software package, from a plurality of software packages, based on information identifying a particular make and a particular model of at least one device;
determining that particular devices, of a group of devices, qualify for the software package when information identifying a make and a model, of each of the particular devices, match the information identifying the particular make and the particular model; and
providing, to each of the particular devices, a corresponding one of a plurality of notifications of the software package when the particular devices qualify for the software package.

8. The method of claim 1, where the software update package comprises firmware over-the-air (FOTA),
where the make information comprises information identifying a manufacturer of the second device, and
where the model information comprises information identifying a model number associated with the second device.

9. A method comprising:
receiving, by a server, make information identifying a make associated with a first device and model information identifying a model associated with the first device, the server being different than the first device,
  the make information and the model information being received from a second device that is different than the first device and the server, and
  the make information and the model information being received as part of the first device being activated;
receiving, by the server and from the second device, a command to provide the make information and the model information, associated with the first device, to a third device to determine whether the first device qualifies for a software update,
  the third device being different than the second device,
  the software update being associated with:
    particular make information identifying a make associated with one or more devices, and
    particular model information identifying a model associated with the one or more devices; and
providing, by the server and to the third device, the make information and the model information, at a first time, based on the command received from the second device
providing, by the server and to the third device, the make information and the model information, at a second time, when the third device indicates that the make information and the model information was not stored in a memory associated with the third device
the third device providing a notification of the software update to the first device when the make information and the model information, associated with the first device, match the particular make information and the particular model information that are associated with the software update.

10. The method of claim 9, where the first device comprises one or more of:
a radiotelephone;
a personal communications system (PCS) terminal;
a personal digital assistant (PDA);
a lap top; or
a personal computer.

11. The method of claim 9, where providing the make information and the model information to the third device includes:
sending, to the third device, the make information and the model information at a time of initial provisioning of the first device.

12. The method of claim 9, where providing the make information and the model information to the third device includes:
providing, to the third device, the make information and the model information via a mobile identification number (MIN) command;
providing, to the third device, the make information and the model information via a mobile directory number (MDN) command; or
providing, to the third device, the make information and the model information via an electronic serial number (ESN) command.

13. A device comprising:
a processor to:
receive, at a first time and from a server, make information identifying a make associated with a user device and model information identifying a model associated with the user device,
  the device being different than the server and the user device, and
  the user device being different than the server,
provide, to the server, a result associated with receiving the make information and the model information at the first time,
receive, after providing the result and from the server, the make information and the model information at a second time, when the result indicates that the make information and the model information were not stored in a memory associated with the device
store the make information and the model information, received from the server at the first time or at the second time, in the memory associated with the device,
determine, after storing the make information and the model information, whether the user device qualifies for a software update package based on the make information and the model information,
  the software update package being associated with particular make information and particular model information,
  the particular make information identifying a make associated with one or more devices, and
  the particular model information identifying a model associated with the one or more devices,
  when determining whether the user device qualifies for the software update package, the processor is to:
    compare the particular make information and the particular model information with the make information and the model information,
determine that the user device qualifies for the software update package when the particular make information and the particular model information match the make information and the model information, and
provide, to the user device, a notification of the software update package based on determining that the user device qualifies for the software update package.

14. The device of claim 13, where the device comprises a server that updates software associated with devices.

15. The device of claim 13, where the processor is further to receive, from the server, device identifier information associated with the user device,
where the device identifier information comprises one or more of:
  a mobile identification number (MIN) associated with the user device,
  a mobile directory number (MDN) associated with the user device,
  an electronic serial number (ESN) associated with the user device, or
  a mobile equipment identity (MEID) associated with the user device.

16. The device of claim 13, where:
the make information comprises information identifying a manufacturer of the user device, and
the model information comprises information identifying a model number associated with the user device.

17. The device of claim 13, where the software update package comprises firmware over-the-air (FOTA).

18. The device of claim 13, where the processor is further to:
provide the software update package to the user device without receiving a request from the user device for the software update package, when the user device qualifies for the software update package.

19. The device of claim 18, where the processor is further to:
receive, from the user device, a result associated with providing the software update package to the user device.

20. The device of claim 13, where the processor is further to at least one of:
receive, from the server, the make information and the model information at a time of initial provisioning of the user device,
receive, from the server, the make information and the model information via a mobile identification number (MIN) command,
receive, from the server, the make information and the model information via a mobile directory number (MDN) command, or
receive, from the server, the make information and the model information via an electronic serial number (ESN) command.

21. The device of claim 13, where the processor is further to:
identify information associated with a group of devices, including the user device, from the memory based on make information and model information associated with a software update,
select the software update package for the group of devices, the software update package being associated with the software update,
compare the particular make information and the particular model information, associated with the software update package, with make information and model information associated with the group of devices, and
determine that the user device is qualified for the software update package when the make information and the model information, associated with the group of devices, match the particular make information and the particular model information associated with the software update package.

22. A system comprising:
a first server, comprising a processor, to:
receive, at a first time and from a second server, make information identifying a make associated with a device and model information identifying a model associated with the device,
the second server being different than the first server and the device,
the device being different than the first server,
provide, to the second server, a result associated with receiving the make information and the model information at the first time;
receive, after providing the result and from the second server, the make information and the model information at a second time, when the result indicates that the make information and the model information were not stored in a memory of the first server;
store the make information and the model information, received at the first time or at the second time, in the memory of the first server,
determine, and after storing the make information and the model information, whether the device qualifies for software based on the make information and the model information,
the software being associated with particular make information and particular model information,
the particular make information identifying a make associated with one or more devices, and
the particular model information identifying a model associated with the one or more devices,
when determining whether the device qualifies for software, the first server is to compare the particular make information and the particular model information with the make information and the model information,
determine that the device qualifies for the software when the particular make information and the particular model information match the make information and the model information, and
provide, to the device, a notification of the software based on determining that the device qualifies for the software.

23. The system of claim 22, where the first server is further to:
receive, from the device, a request for the software based on the notification, and
provide the software to the device based on the request.

24. The system of claim 22, where the first server is further to at least one of:
receive, from the second server, identification information of the device, the make information, and the model information at a time of initial provisioning of the device,
receive, from the second server, identification information of the device, the make information, and the model information via a mobile identification number (MIN) command,
receive, from the second server, identification information of the device, the make information, and the model information via a mobile directory number (MDN) command, or
receive, from the second server, identification information of the device, the make information, and the model information via an electronic serial number (ESN) command.

25. The system of claim 22, where the first server is further to:
identify information associated with a group of devices, including the device, from the memory based on make information and model information associated with a software update,
select the software for the group of devices,
the software being associated with the software update,
compare the particular make information and the particular model information, associated with the software, with make information and model information associated with the group of devices, and
determine that the device qualifies for the software when the make information and the model information, associated with the group of devices, match the particular make information and the particular model information associated with the software.

* * * * *